United States Patent [19]
Hewitt

[11] Patent Number: 4,840,444
[45] Date of Patent: Jun. 20, 1989

[54] COMPOSITE HOLOGRAPHIC ELEMENTS

[76] Inventor: Brian Hewitt, The Street, 2 Croft Cottages, Wattisfield, Suffolk, England, IP22 1NS

[21] Appl. No.: 190,686
[22] PCT Filed: Aug. 17, 1987
[86] PCT No.: PCT/GB87/00579
§ 371 Date: Apr. 13, 1988
§ 102(e) Date: Apr. 13, 1988
[87] PCT Pub. No.: WO88/01403
PCT Pub. Date: Feb. 25, 1988

[30] Foreign Application Priority Data
Aug. 15, 1986 [GB] United Kingdom ............... 8619922

[51] Int. Cl.$^4$ ............................................. G03H 1/22
[52] U.S. Cl. ...................................... 350/3.85; 350/3.6
[58] Field of Search ...................... 350/3.6, 3.85, 3.61

[56] References Cited
U.S. PATENT DOCUMENTS
T861,026  4/1969  Harper et al. ................... 350/3.6 X
4,315,665  2/1982  Haines .............................. 350/3.61

FOREIGN PATENT DOCUMENTS
1397447  6/1975  United Kingdom .

Primary Examiner—Bruce Y. Arnold
Attorney, Agent, or Firm—Fitch, Even, Tabin & Flannery

[57] ABSTRACT

A composite holographic element (10) comprises a substrate (11) having on one surface (12) a relief pattern providing a holographic image when viewed in reflection, a partially reflective layer (14) facing the said surface, and a thin optically absorbent layer (13) adjacent the substrate.

4 Claims, 1 Drawing Sheet

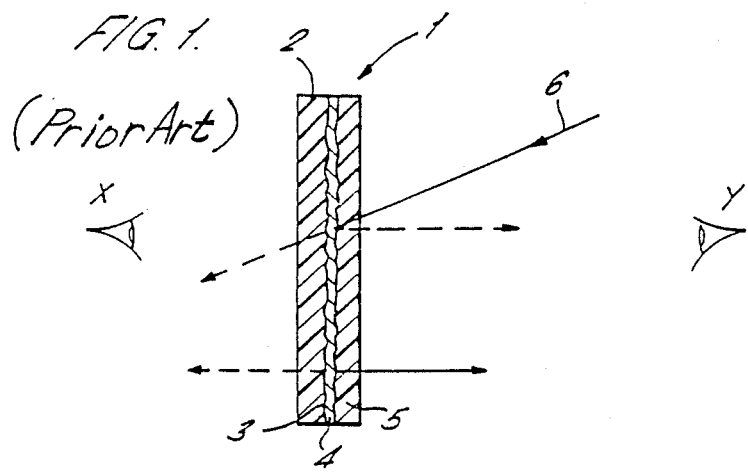
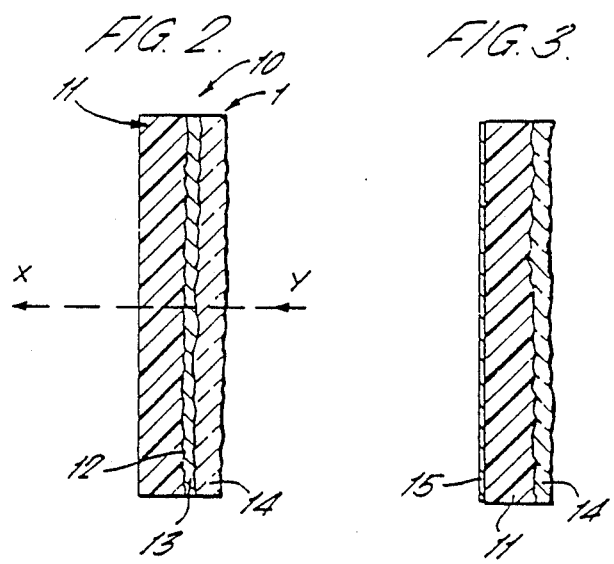
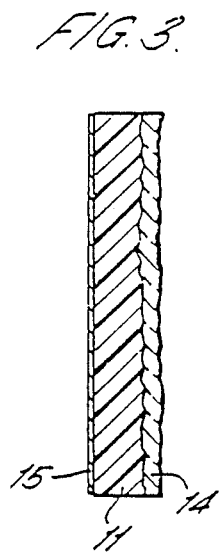
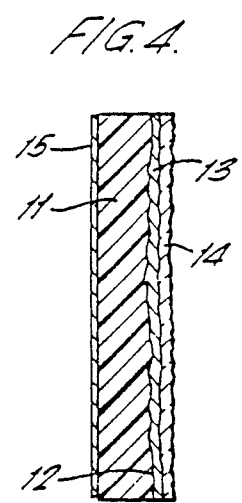

COMPOSITE HOLOGRAPHIC ELEMENTS

The present invention relates to optical elements which can provide holographic images and particularly to composite optical elements which may, for example, be employed in sunglasses or the like to provide a holographic image in reflection to a viewer without substantial detriment to the other optical function or functions of the element.

It is known from articles and work by Claude Pueche (Thomposn CSF) to coat a substrate bearing a surface relief hologram with a substantially transparent coating of a different refractive index to the substrate and thereby to obtain a visible holographic image in reflection.

It is proposed in the specification of U.S. Pat. No. 4,315,665 to provide a composite optical element which comprises a first layer or substrate bearing holographic information in the form of a surface pattern, a thin coating which conforms to the surface pattern and is either partially reflective or is of a transparent material of which the reflection index is different from the reflective index of the said substrate and a third layer which fills in the surface variations of the said coating, the third layer being optically transparent, having a refractive index equal to that of the first layer. It is found however that a hologram produced in reflection by such an element may be rather dim. Moreover if the thin coating or intermediate layer is increased in thickness to enhance the brightness of such a hologram the optical performance of the element in other respects is degraded.

It is accordingly one object of the present invention to provide an improved optical element which can provide a holographic image with substantially no detriment to the optical performance of the element and in particular to provide an improved optical element for sunglasses or eyeshades.

An important feature of the invention is the inclusion, in a composite structure including a substrate which carries a surface relief pattern adapted to produce a holographic image in reflection, of a thin optically absorbent layer. Such a layer may be provided between the surface bearing the relief pattern and a further, partially reflective layer. Additionally or alternatively such an absorbent layer may be provided on the opposite surface of the substrate. The absorbent layer or layers provide a means of substantially reducing visible diffraction or refraction disturbance arising from either light transmission through the element from the side facing the surface relief pattern or from reflection of light incident on the element in the opposite direction.

BRIEF DESCRIPTIONN OF THE DRAWINGS

FIG. 1 is a schematic drawing illustrating a known form of composite element; and FIGS. 2, 3 and 4 are schematic drawings illustrating various composite elements according to the invention.

DETAILED DESCRIPTION

A surface relief pattern may be formed using known holographic techniques on a substrate. At the present time the use of holography is the only practical method to form images of objects in a reflected light beam from a composite optical element. A pattern of light interference fringes may be formed by the interference of a reference beam or beams of coherent or substantially coherent light with a similar coherent or substantially coherent beam of light identified as an object beam or beams, upon a specially prepared detector. The detector may comprise a substrate which is treated with a photo resist material, silver halide film or a thermoplastic, photopolymer or another medium which may be bleached, etched or developed so as to form a surface relief pattern, constituting a hologram. Multiple copies of the resultant surface relief hologram may be made using known techniques from a master hologram, or for the purposes of making an acceptable copy or copies of this master reference waves may be formed using unconventional or novel optics, resulting in an overall improved resolution of the image to be copied. These techniques include the making of secondary metal masters, embossing and injection moulding.

FIG. 1 illustrates a prior proposal for a composite optical element for providing a holographic image in reflection. The element 1 comprises a transparent substrate 2 which has one surface 3 formed into a surface relief hologram. A thin layer 4 is deposited on the surface 3. This layer 4 may be a thin metallic coating which can reflect 5% or more of light incident on it. Alternatively, the layer 4 may be of a substantially transparent material having an index of refraction that is substantially different from the index of refraction of the substrate 2. A third layer 5 is provided to fill in the surface variations of the layer 4 with a substantially optically transparent layer of material having substantially the same refractive index as the substrate. The refractive index of the coating 4 should be at least 3% different from the refractive index of the substrate 2.

The purpose of the structure is to enable a viewer at position Y (facing the surface hologram) to view a holographic image formed in reflection of light 5 incident on the element.

It is usually intended that the element 1 be a lens element in, for example, sunglasses worn by a wearer whose eye will be at position X, on the opposite side of the element to the viewer to position Y. It will usually be found that when viewed from position X the diffraction of light passing through the element will create a view of the spectral conditions of the element. If the intermediate layer 4 is such that 95% of incident light is transmitted through the layers 5, 4 and 3, in that order, then the diffraction effects will be quite small but the hologram which is to be viewed in reflection by a viewer at position Y is likely to be unacceptably dim. If, for example, the layer 4 is increased in thickness so as to increase its reflectivity, the resulting enhanced diffraction effects will increasingly interfere with the ability of a "wearer" at position X to look through the element with comfort. Additionally, as the intermediate layer 4 is increased to enhance the reflection mode available at position Y, a second effect, found to be detrimental to a viewer at X, begins to occur. When light incident upon the layers 3 and 4 from the direction of position X falls upon the reflectively coated surface relief pattern, a bright holographic diffraction pattern is created, interfering with the ordinary viewing that should be provided for a viewer at position X. This effect is most noticeable when highly reflective materials such as aluminium are deposited.

In order to reduce the aforementioned difficulties the structures shown in FIGS. 2, 3 or 4 may be adopted.

With reference to FIG. 2, an optical element 10 comprises a transparent substrate 11 which has a surface 12 formed into a holographic surface relief pattern by any of the methods known in the art. Subsequently an extremely thin layer of metal or other material is deposited to form a layer 13 and a second layer 14 of metal or other material such as magnesium fluoride may be deposited upon layer 13. The layers 13 and 14 should have slightly different indices of refraction. These two layers may closely conform to the surface relief pattern on the substrate 11 but the pattern should not be filled in.

The layer 13 may, for example, be of the order of 50 to 70 Angstroms in thickness and may be composed of an optically predominantly absorbent composite material such as Inconel.

The layer 13 is required to be such as will absorb light. Preferably this thin layer may allow approximately 60% of incident light to be transmitted. The layer 14 may be relatively thick compared to the layer 13; the layer 14 reflects rather than absorbs light. The layer 14 is intended to provide a further reduction in the transmission of light from position Y to position X that is to say through the substrate in the normal direction of incident light. The layer 14 may reflect up to 50% of the light incident on it. Thus for light incident from Y, up to 50% may be reflected, up to 40% may be absorbed and 10% may be transmitted through the composite element.

The element may be protected by any suitable protective coating having a refractive index substantially the same as the substrate 11.

The intermediate layer absorbs light, as in a neutral density filter, relative to a wearer at position X. The absorbent layer 13 should not be a coating relative to air, although layer 14 may be a reflective metal coating with an air interface. The resultant structure may be likened to a mirror which on one side acts as an attenuating plate. The structure provides a considerable reduction of visible diffraction disturbance to a wearer either from the incident light transmitted from Y to X or from reflected diffraction from the side facing the wearer by light incident on the element from the X-side.

FIG. 3 illustrates an alternative embodiment in which the absorbent layer (shown at 15) is coated on the opposite face of the substrate to that carrying the surface relief pattern. Preferably the layer 15 is subsequently protected not just for its reflective properties but for the scratch resistant properties which are provided by an optical coating of known composition.

In the embodiment shown in FIG. 4, each side of the substrate 11 receives a thin coating (13,15 respectively) both adapted to absorb transmitted light entering from either side of the optical element.

Absorbtion and reflection in respect of this application are important. It is possible to compute reflectance from a surface if one applies for example a quarter-wavelength of a material which can be evaporated into a surface. A formula is:

$$\text{Reflectance } (R) = [(n_o - y)/(n_o + y)]^2$$

where y is the admittance of the system, i.e. $n^2_1/n_2$, $n_o$ is the refractive index of air (n=1.00029) or of any other transmitting medium, $n_1$ is the refractive index of the thin film to be applied, and $n_2$ is the refractive index to air of the substrate.

For example, if Inconel with a transmission value of 60% as in the composite structure is applied to provide this transmission value then, when the refractive index of Inconel is known this coating when applied to glass and with no additional coatings gives a reflectivity of approximately 14% to air. When adopting further coatings this may reduce to 8% or thereabouts. For example a glass substrate having on one side an extremely thin layer of Inconel and then a layer of aluminium may provide a reflectivity of 70% from the coated side and 45% from the other side. Inconel in these conditions acts as an attenuating or absorbtion principle, providing in this example an absorbtion value of approximately 25%. Other values, more comprehensively calculated and using other materials, may be used.

I claim:

1. A composite optical element comprising a substrate having on one surface a surface relief pattern capable of providing a holographic image when viewed in reflection, a partially reflective layer facing the said surface of the substrate, and at least one thin optically absorbent layer adjacent the substrate to provide absorption of light incident on the substrate.

2. An element according to claim 1 in which the absorbent layer is disposed between the said surface of the substrate and the said reflective layer.

3. An element according to claim 1 in which the absorbent layer is on the surface of the substrate opposite that bearing the relief pattern.

4. An element according to claim 1 in which a first absorbent layer is disposed between the said surface of the substrate and the said reflective layer and a second absorbent layer is on the surface of the substrate opposite that bearing the relief pattern.

* * * * *

UNITED STATES PATENT AND TRADEMARK OFFICE
CERTIFICATE OF CORRECTION

PATENT NO. : 4,840,444
DATED : June 20, 1989
INVENTOR(S) : Brian Hewitt

It is certified that error appears in the above-identified patent and that said Letters Patent is hereby corrected as shown below:

Column 1, line 12, change "Thomposn" to --Thompson--.

Column 4, line 3, change "Absorbtion" to --Absorption--.

Column 4, line 9, change "$[n_o - y)/(n_o + y)]^2$" to --$[(n_o - y)/(n_o + y)]^2$--.

Column 4, line 27, change "absorbtion" to --absorption--.

Column 4, line 28, change "absorbtion" to --absorption--.

Signed and Sealed this

Twenty-ninth Day of May, 1990

*Attest:*

HARRY F. MANBECK, JR.

*Attesting Officer*  Commissioner of Patents and Trademarks